J. W. BAILEY.
APPARATUS FOR THE PRODUCTION OF LEAD PIGMENTS.
APPLICATION FILED MAR. 12, 1909. RENEWED NOV. 14, 1911.
1,031,160.
Patented July 2, 1912.
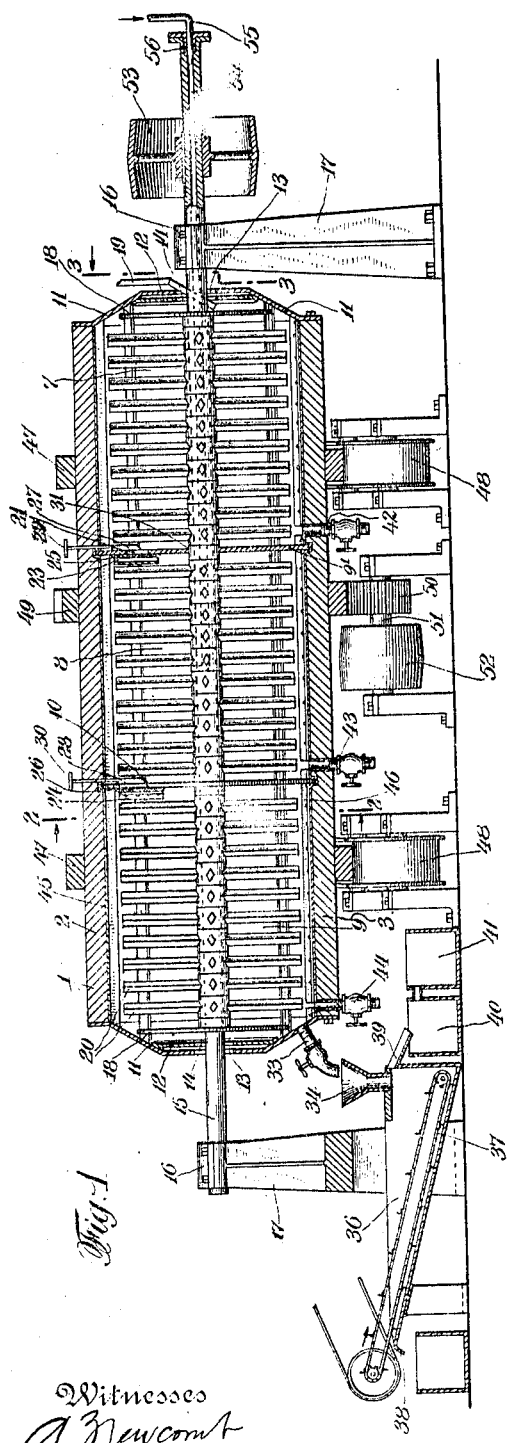
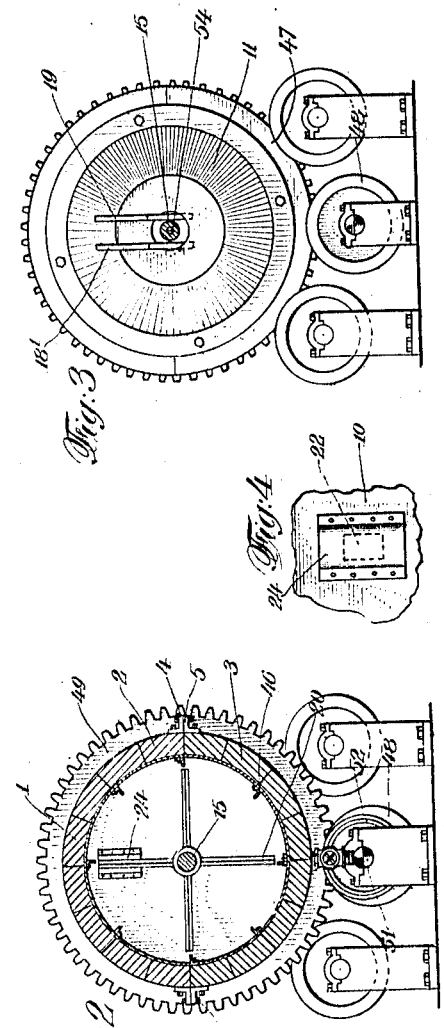
Witnesses
A. Newcomb
M. Meikle
Inventor
John W. Bailey
By his Attorneys
Prindle & Wright

UNITED STATES PATENT OFFICE.

JOHN W. BAILEY, OF NEW YORK, N. Y., ASSIGNOR TO INTERNATIONAL LEAD COMPANY, A CORPORATION OF NEW JERSEY.

APPARATUS FOR THE PRODUCTION OF LEAD PIGMENTS.

1,031,160.　　　　Specification of Letters Patent.　　Patented July 2, 1912.

Application filed March 12, 1909, Serial No. 482,965.　Renewed November 14, 1911.　Serial No. 660,307.

*To all whom it may concern:*

Be it known that I, JOHN W. BAILEY, of New York, in the county of New York and in the State of New York, have invented a certain new and useful Improvement in Apparatus for the Production of Lead Pigments, and do hereby declare that the following is a full, clear, and exact description thereof.

My invention relates especially to an improvement in apparatus for the production of lead oxids and white lead.

The object of my invention is to provide an apparatus for the production of lead oxids and white lead which is exceedingly rapid and which results in a product having properties hitherto unattainable. The white lead produced by my apparatus has a greater weight compared with the amount of lead contained within it than the white lead made by former apparatus. The white lead produced by my apparatus is also distinctive because of its great covering power.

Hitherto lead oxids preparatory to the production of white lead therefrom, have been produced either by methods involving the use of reverberatory furnaces or furnaces of a similar character, or they have been made by a slow process of attrition under a body of water and an oxidation of the comminuted lead in the presence of oxygen or air. Usually in the latter process it is necessary to use compressed air to prevent the process from occupying an interminable period of time. The former method has many disadvantages, among which are the great expense involved, owing to the necessity of employing skilled labor to operate the furnaces, and the danger to the health of the employees. The latter method is very disadvantageous, as it requires, a long period of time to effect the comminution and oxidation of the lead, and is, consequently, extremely expensive. Furthermore, by the latter method lead sub-oxid or monoxid or a mixture of oxids merely is formed, the process not being capable of such a control as to result in the production of either the monoxid or dioxid as desired. My apparatus, on the other hand, effects the production of oxids of lead and white lead in an exceedingly short space of time. The products are, furthermore, formed in a single machine which is adapted to operate continuously and requires very little attention. By controlling the operation of my machine either the dioxid or the monoxid can be formed.

In the operation of my machine lead is brought to such a high temperature and fine state of comminution by frictional attrition in the presence of air and water that some of the water is decomposed, giving up oxygen to the lead.

I have shown one embodiment of my invention in the accompanying drawings, in which—

Figure 1 is a vertical longitudinal section of the apparatus; Fig. 2 is a vertical transverse section of the same; Fig. 3 is an end elevation thereof; and Fig. 4 is an elevation of a detail.

Referring to the drawings, 1 is a rotary drum which may be divided longitudinally into two portions 2 and 3 of semi-circular cross-section. The portions 2 and 3 are bolted together by means of flanges 4 and 5 and bolts 6. The drum 1 is divided into a plurality of chambers 7, 8 and 9 by means of transverse partitions 9' and 10. In order to prevent the liquids and solids from escaping from the drum, the latter is provided with two conical heads 11, each having a shield plate 12 therein. The conical heads 11 and shield plates 12 are provided with centrally located apertures 13 and 14 for the passage of a shaft 15. The shaft 15 is supported in journal bearings 16 carried by standards 17. Within each of the conical heads of the drum the shaft 15 carries a guard 18 to prevent the escape of the materials and their reaching the journal bearings 16. Inlet pipes 18' and 19 project into the drum at the inlet end thereof through the apertures 13 and 14, for the purpose of feeding lead and water to the apparatus. The shaft 15 carries a plurality of arms 20 of diamond-shaped cross-section and made of phosphor bronze located in the chambers 7, 8 and 9.

The partitions 9' and 10 contain ports 21 and 22 having U-shaped plates 23 and 24 over the same so as to permit the materials to flow only in one direction. The ports 21 and 22 are provided with wire gauze 25 and 26, to permit the passage of particles of oxid of only a certain fineness. The gauze 25 upon the port 21 is of a coarser mesh, however, than the gauze 26 upon the port 22, so as to cause the oxid passing through the apparatus to become progressively finer. Provision is also made for controlling the size of the ports 21 and 22 by locating over the same slide valves 27 and 28, controlled respectively by handles 29 and 30 located on the outside of the drum. The partitions 9' and 10 are provided with centrally located apertures 31 and 32 for the passage of the shaft 15. The conical head 11 at the outlet end of the cylinder is provided with a valved outlet pipe 33 discharging into a pipe 34, leading to a floating box 36. The floating box contains a chain 37 for removing any non-floatable solids and discharging the same through an outlet 38 for returning the same to the drum for further treatment, and another outlet pipe 39 for carrying off the floatable solids and water to a plurality of settling tanks 40 and 41. A plurality of settling boxes are provided so that the material being discharged can be diverted from one box to another, while the material in one of the boxes is being allowed to settle to separate the oxid.

The chambers 7, 8 and 9 are provided with outlet pipes 42, 43 and 44 to discharge the contents when the apparatus is to be cleaned or supplied with an entirely new body of material.

The interior of the drum is lined with copper or brass sheathing 45. On the interior of the drum there are situated a number of ribs or buckets 46 for raising the stock from the bottom of the drum and showering the same upon the rotating arms 20. The drum has located upon its periphery a pair of annular tracks 47, which run upon rollers 48, to permit the rotation of the drum. An annular gear 49 is also attached to the outside of the drum in such a manner as to mesh with a gear 50 carried by a shaft 51 which is positively driven from a pulley 52. Suitable power connections are made with the pulley 52 to positively rotate the drum at the rate of approximately twenty revolutions per minute. Attached to the shaft 15 there is also a pulley 53 for positively driving the same at a speed of approximately seven hundred revolutions per minute.

For the purpose of feeding carbon dioxid to the apparatus when it is desired to complete the production of white lead in this machine, the shaft 15 is provided with a passage 54 connecting at one end with the central chamber 8 and at the other with a pipe 55 projecting into the end of the shaft through a stuffing box 56 upon the end of the shaft. The transformation of the lead oxid into white lead may, however, if desired, be carried out in another apparatus.

In the operation of the machine, a quantity of water and granulated or comminuted lead is fed into the chamber 7 through pipes 18' and 19. The drum 1 and shaft 20 are then rotated. The liquid thus introduced into the receptacle 7 is repeatedly raised by means of the ribs or buckets 46 and repeatedly showered upon the rotating arms 20. The arms 20 because of their beveled edges strike the falling particles of lead suspended in moist air glancing blows of terrific force. The particles upon being struck are usually again projected against other moving arms, where they are subjected to a like action. As a result, the particles of lead are subjected to a violent frictional action, producing an effective attrition tending toward a further comminution of the particles. Owing to this action, furthermore, the individual particles of lead are raised to a very high temperature, considerably above the boiling point of water. During the process a portion of the water is decomposed and the particles of lead rapidly unite with the nascent oxygen and oxygen of the air contained within the chamber, thus producing an oxid of lead. If the arms 20 are rotated at a comparatively slow speed and a comparatively short period of time lead monoxid is produced, while, if the arms are driven at a much higher speed and for a longer period of time, lead dioxid results, it being thus entirely within the control of the operator as to which oxid is obtained. Any particles of lead or water which may reach the shields 12 or guards 18, are thrown outwardly against the conical heads 11 by centrifugal force and returned to the chamber 7.

The supporting of the drum 1 independently of the shafts 15, so that the shafts 15 pass freely through openings provided in the ends of the drum, is an important feature of my invention, inasmuch as were the drum to be supported from the shaft in any other manner it would be a matter of a very short while before the drum would be stopped by the lead which would accumulate in the bearings.

When the particles of lead have become sufficiently comminuted and a sufficient body of liquid has been conveyed into the interior of the chamber 7, said lead particles pass through the screen 26, together with a portion of the body of water, and escape from beneath the plate 23 into the succeeding chamber 8. The liquids and solids are passed from one chamber to the other around the U-shaped plates 23 and 24 by the splashing which is effected by the arms 20. The shape and location of these plates is such as to cause the liquids and solids to be forced only in one direction. From this chamber the particles of lead and lead oxid are subjected to the same treatment which they have received in the chamber 7. As a result, the particles are further comminuted and oxidized in a similar manner. When the particles have become comminuted sufficiently, they together with a portion of the body of water in the chamber 8, pass through the screen 26 and beneath the plate 24 into the chamber 9. Here they are again subjected to the same treatment. When the oxidation is completed, the lead and water in this chamber are permitted to escape through the outlet pipe 33 into the floating box 36 where any lighter solids are separated and the heavy metallic solids and liquid are discharged into one or the other of the settling tanks 40 and 41, to separate the oxids from the liquid.

If desired, an oxidizing agent may be used to assist in the oxidation of the lead.

In case the apparatus is used for the production of white lead, the machine is operated in exactly the same manner as above described until the desired oxid is formed. Carbon dioxid and a suitable acid, if desired, is then led into chamber 8 through passage 54 and pipe 55, whence it spreads throughout the entire machine. Because of the peculiar fineness of the oxids produced by my apparatus, the latter combine with the carbon dioxid with extreme rapidity, without the necessity of any artificial pressure, and in a remarkably short space of time the completed product can be discharged from the outlet pipe 33 to be dried and further refined in the usual manner.

While I have described my invention above in detail, I wish it to be understood that many changes might be made therein without departing from the spirit of my invention. Among other changes that might be made, the partitions may be dispensed with entirely and the machine operated for a predetermined period of time for the production of any particular oxid, or for the transformation of a particular oxid into white lead. Again, in certain instances it might be found desirable to change the direction of rotation of the arms or to maintain either the drum or the arms stationary while the arms or drum are rotated.

I claim:—

1. In a device of the character described, the combination of a drum, means for rotating the same, said drum containing a transverse partition permitting the passage of materials in one direction only.

2. In a device of the character described, the combination of a drum, means for rotating the same, said drum containing a transverse partition permitting the passage of materials in one direction only, and one or more arms on either side of said partition within the drum.

3. In a device of the character described, the combination of a drum, and means for rotating the same, said drum containing a number of transverse partitions provided with ports and devices permitting the passage of materials in one direction only.

4. In a device of the character described, the combination of a drum, and means for rotating the same, said drum containing a number of transverse partitions provided with screened ports and devices permitting the passage of materials in one direction only.

5. In a device of the character described, the combination of a drum, and means for rotating the same, said drum containing a number of transverse partitions provided with ports having screens of progressive fineness and devices permitting the passage of materials in one direction only.

6. In a device of the character described, the combination of a drum, means for rotating the same, said drum containing a number of transverse partitions provided with ports and devices permitting the passage of materials in one direction only, and a plurality of rotary arms in said drum.

7. In a device of the character described, the combination of a drum, means for rotating the same, said drum containing a number of transverse partitions provided with screened ports and devices permitting the passage of materials in one direction only, and a plurality of rotary arms in said drum.

8. In a device of the character described, the combination of a drum, means for rotating the same, said drum containing a number of transverse partitions provided with ports having screens of progressive fineness and devices permitting the passage of materials in one direction only, and a plurality of rotary arms in said drum.

9. In a device of the character described, the combination of a drum with an opening in its end adapted to contain a body of liquid having a rib or bucket upon its inner face, a rod-like arm in said drum and means for rotating the drum and arm relatively to each other.

10. In a device of the character described, the combination of a drum with an opening in its end and adapted to contain a body of liquid, having one or more ribs or buckets upon its inner face, means for rotating the drum, a plurality of rod-like arms in said drum and means for rotating the arms and the drum at different speeds.

11. In a device of the character described, the combination of a drum, means for rotating the same, a conical head upon said drum having an opening at its apex and a shaft passing through said opening without touching the conical head and carrying arms rotatable relatively to said drum.

12. In a device of the character described, the combination of a drum, means for rotating the same, a conical head upon said drum having an opening at its apex, a shaft passing through said opening without touching the conical head, and carrying arms rotatable relatively to said drum and one or more feed pipes in said opening.

13. In a device of the character described, the combination of a drum, means for rotating the same, a head upon said drum having an opening therein, a shield plate attached to said head, and a shaft passing through said opening without touching the head.

14. In a device of the character described, the combination of a drum, means for rotating the same, a head upon said drum having an opening therein, a shield plate attached to said head, a shaft passing through said opening without touching the head, and one or more feed pipes in said opening.

15. In a device of the character described, the combination of a drum, means for rotating the same, a head upon said drum having an opening therein, a shield plate attached to said head, a shaft passing through said opening without touching the head, and a guard attached to said shaft before said opening and near the head.

16. In a device of the character described, the combination of a drum, means for rotating the same, a head upon said drum having an opening therein, a shaft passing through said opening without touching the head, and a guard located in the drum before said opening.

17. In a device of the character described, the combination of a device for producing lead pigments, a discharge pipe connected thereto, a settling tank communicating with said discharge pipe, and a float box connected to said settling tank.

18. In a device of the character described, the combination of a drum, a head upon said drum having an aperture therein, and a horizontal shaft passing into said drum through said aperture without touching the head, said shaft being rotatable relatively to the drum, but being carried in bearings at a distance from the plane of said drum head.

19. In a device of the character described, the combination of a drum, a head upon said drum having an aperture therein, a horizontal shaft passing into said drum through said aperture without touching the head, and carrying arms rotatable relatively to said drum and one or more pipes entering said aperture.

20. In a device of the character described, the combination of a rotary drum, a shaft passing through the same, and a plurality of arms upon the shaft, the drum being divided longitudinally to permit the removal of the shaft and arms.

21. In a device of the character described, the combination of a drum having a plurality of partitions therein, a shaft passing through the same, and a plurality of arms upon the shaft, the drum being divided longitudinally to permit the removal of the shaft and arms.

22. In a device of the character described, the combination of a drum having a plurality of transverse partitions therein, a shaft passing through the same, and a plurality of arms upon the shaft, the drum being divided longitudinally to permit the removal of the shaft and arms.

23. In a device of the character described, the combination of a drum, a head upon said drum having an aperture therein and a shaft passing into said drum through said aperture without closing said aperture, and without being connected to the drum said shaft being rotatable relatively to the drum but being carried in bearings outside of the drum, and at a distance from the plane of said drum head.

24. In a device of the character described, the combination of a drum with an opening in its end adapted to contain a body of liquid, having a rib or bucket upon its inner face, a rod-like arm in said drum and means for producing a relative rotation of the drum and arm.

In testimony that I claim the foregoing I have hereunto set my hand.

JOHN W. BAILEY.

Witnesses:
A. NEWCOMB,
ARTHUR WRIGHT.